United States Patent Office 3,150,079
Patented Sept. 22, 1964

3,150,079
SEPARATION BY SELECTIVE DESORPTION
OF SILICA GEL
Norton H. Berlin, Fords, N.J., assignor to Esso
Research and Engineering Company, a corporation
of Delaware
No Drawing. Filed July 13, 1960, Ser. No. 42,467
3 Claims. (Cl. 208—310)

This invention relates to a process for separation of aromatic hydrocarbons from other hydrocarbons, the separation of condensed ring aromatics from single ring aromatics and the use of said condensed ring aromatics as lubricating oil additives. More particularly, the invention is directed to a process wherein constituents are removed from hydrocarbon mixtures boiling within the range of gas oil and lubricating oil by adsorption on an adsorbent material, the selective recovery of the adsorbed constituents, and the regeneration of the adsorbent for further use.

Processes for extracting mineral lubricating oil stocks with adsorbents are well known and are particularly useful for separating the high viscosity index, more paraffinic components from the low viscosity index, more aromatic components. As a rule, the extraction step is carried out by adsorbing the lubricating oil feed stock on the adsorbent in a suitable contacting device followed by desorbing the relatively loosely adsorbed paraffinic and naphthenic components with a non-polar solvent. The more strongly adsorbed aromatic constituents may then be selectively desorbed by contacting the adsorbent with a polar solvent or by other means.

It is known that a complex hydrocarbon mixture such as gas oil or lubricating oil may be separated to some extent; according to chemical type, by selective adsorption on certain adsorbent materials. It is well recognized that silica gel is one of the most efficient adsorbents for this purpose. It has also been generally recognized that the adsorptive affinity of silica gel and like adsorbents varies with the chemical type of compound in accordance with the following decreasing order of adsorptivity:
(1) Water
(2) Organic polar substances such as alcohols, phenols, ketones, ethers, and their sulfur and nitrogen analogs
(3) Aromatics
(4) Olefins
(5) Naphthenes
(6) Paraffins Thus, of the main hydrocarbon types comprising gas oil or lubricating oil fractions, aromatics are the most readily adsorbed by silica gel and methods of effecting the removal of aromatics from other hydrocarbons by means of silica gel are known to the art. In general, these methods comprise contacting the hydrocarbon charge with silica gel to adsorb aromatics, paraffins, and naphthenes and following this with a desorption step wherein the gel is contacted with a non-polar material which removes the paraffins and naphthenes without affecting the aromatics. This is followed by a polar solvent which is very strongly adsorbed, for instance, water, methanol or acetone, and which serves to replace the aromatics on the gel. The aromatic hydrocarbons thereby are removed from the gel in admixture with excess desorbing agent, from which they may be recovered by distillation, extraction, decantation or the like. This procedure effects only a rather general separation between aromatics and saturates (paraffins and naphthenes) without solving the problem of the separation of the various aromatics from each other.

Formerly it had been possible to separate condensed ring aromatics from single ring aromatics only by a two-stage analytical process. This is accomplished by first separating all of the aromatics from the rest of the feed stock by silica gel adsorption and preferential desorption. Then the aromatics are further separated into single rings and condensed rings by alumina adsorption and preferential desorption. However, the method of the invention effects separation of paraffins as well as separating single ring aromatics from condensed ring aromatics, all in a single stage operation.

The above silica gel-alumina technique is inherently disadvantageous because two steps are needed. Also, an additional disadvantage is that in this two-stage process, alumina fines are formed and entrained. It was known that in a single step silica gel percolation a paraffin, preferably normal heptane, could be used to selectively desorb the paraffins and naphthenes; a single ring aromatic such as benzene could be used to selectively desorb the aromatics, and a polar substance such as acetone, finally would selectively desorb the non-hydrocarbons. This procedure was unsatisfactory because no sharp separation could be obtained between the single ring aromatics and the condensed ring aromatics.

This invention represents an improvement over prior processes in that it is useful in the separation of single ring and condensed ring aromatic products in the same process and, in addition, a very high degree of purity of single ring aromatics can be obtained. The invention provides a means of separating hydrocarbon oils into saturates, that is, non-aromatics, and several aromatic fractions including one ring aromatic fractions and condensed ring aromatic fractions. Thus, a tool is available for providing large quantities of relatively pure single ring aromatics and condensed ring aromatics.

Another feature of this invention resides in the means of producing high viscosity index motor lubricants having very low oxidation tendencies. This result is obtained because certain components of various feed stocks are natural oxidation inhibitors. These inhibitors can now be separated from a feed stock and then placed back within the paraffinic-naphthenic fraction of a feed stock. Thus, an extracted oil of improved stability and good viscosity index is obtained using only the components of the original feed stock. The oxidation inhibitor in the feed stock is a condensed ring aromatic extract obtained by selective desorption. Although it is known that aromatic constituents, in general, may act as oxidation inhibitors, it has not been possible heretofore to pinpoint which type of aromatic is most effective. By means of the separation technique of the invention, it has now been discovered that the aromatic cuts containing the highest proportion of condensed ring aromatics are most effective with regard to oxidation stability. From 2–20 wt. percent, e.g., 12–18 wt. percent of the condensed ring aromatics can be blended with the paraffin-naphthenic fraction or other lubricating oil base to produce the oxidation stable lubricant.

It was then discovered and is a feature of this invention that when a $C_6$–$C_{10}$ olefin, preferably diisobutylene was used as an intermediate selective desorbent between the paraffinic desorbent such as hexane, heptane, or isooctane and the aromatic desorbent such as benzene or toluene, the olefin will preferentially desorb the single ring aromatics but not the condensed ring aromatics. This separation between single rings and condensed rings is as good as the above-described two-step analytical technique. In general, the procedure of the invention is carried out by completely adsorbing a charge of feed stock on silica gel. The silica gel is next treated with a paraffinic desorbent, e.g. normal heptane to selectively desorb the paraffins and naphthenes. The normal heptane wash is followed with a diisobutylene wash which selectively desorbs the single ring aromatics. This followed by an aromatic, e.g., benzene, wash which selectively desorbs the condensed ring aromatics and, finally, if the gel is to be reused, it is washed with a polar solvent such as acetone which desorbs the non-hydrocarbons such as oxygenated nitrogen and sulfur compounds. The washing step with the polar solvent can be eliminated if it is not desired to regenerate the adsorbent or recover the non-hydrocarbons.

Although the above-described four solvent single step system effected very good separations, it could be further improved by using 5 to 15%, preferably 10% by volume, of the aromatic desorbent in the paraffinic desorbent in place of the olefin desorbent. The olefin tended to polymerize to a slight extent on the adsorbent.

The purity of the single ring aromatic separation effected by the aromatic in paraffinic solvent is not only comparable to that obtained in the two-step separation but the polymerization nuisance is avoided.

The fractions selectively desorbed from the silica gel are generally most economically recovered by distillation. It is obviously advantageous economically if the fractionation can be accomplished easily without the necessity of numerous plates, compression and/or refrigeration. Furthermore, it is of importance to recover substantial portions of the various solvents for recycle in the process. The selection of the solvents, therefore, will be done in such a manner that the boiling points of the solvent and the desorbed fraction are sufficiently apart to facilitate ease of distillation. Evaluation of these considerations, according to the particular separations desired under the conditions prevailing, will be readily accomplished by those skilled in the art. With these factors in mind, the following solvents are in general typical of those which may be used.

The paraffinic desorbing solvent may be any normally liquid alkane or mixture thereof having from 5 to 30 carbon atoms, e.g. 5–15 carbon atoms. Examples of alkanes suitable for this purpose are the normal and branched pentanes, hexanes, decanes, pentadecane, licosane, dotriacotane, tetracontane, pentatetracontane, and the like. N-heptane is particularly preferred.

Aromatic desorbents suitable for the purpose of the invention are those aromatic compounds having a benzene nucleus which can be substituted with up to four $C_1$–$C_5$ alkyl substituents. Examples of such pure aromatics are toluene, ethylbenzene, xylenes, mesitylene and the like. Benzene is particularly preferred.

The use of polar solvents to wash non-hydrocarbons from adsorbents is well known and not a feature of applicant's invention.

In some instances, the recovery of non-hydrocarbons might be desirable. Even when the non-hydrocarbons are not wanted, the polar solvent step will be necessary to prepare the silica gel for regeneration. When the silica gel is not to be regenerated and it is not desired to recover the non-hydrocarbons, the polar solvent step can be omitted.

The regeneration of silica gel for future use was another difficulty encountered in large-scale silica gel separations. In laboratory work only small quantities of silica gel are needed and these are normally disposed of after each run. It would be more expensive to regenerate such small quantities of gel than to replace them with new silica gel. The problem of large-scale regeneration was solved when it was discovered that a hot purging by an inert gas such as flue gas, light hydrocarbon gases and particularly nitrogen gas would effectively remove the adsorbed polar solvent. The inert gas passing over the gel evaporates the adsorbed solvent, without being adsorbed itself. As the silica gel pore structure tends to collapse when subjected to temperatures of about 600° F., the temperature of the purging gases should not exceed this limitation. Solvents are purged from the gel by an inert gas at a temperature of about double the boiling point of the solvent. Thus, the choice of polar solvent will be dictated by considerations of the decomposition temperature of the gel, and the ease of separation of solvent from the non-hydrocarbons, especially since it is desirable to recover substantially all of the solvent for reuse. With these factors in mind, the following solvents are, in general, typical of those that may be used; ketones, alcohols, esters, pyridines and the like. Acetone is particularly preferred.

In order to ascertain the amount of solvent needed to selectively desorb the various components of the mixture, a rough quantitative analysis can be run on a small sample of the mixture using analytical methods known in the art. In general 0 to 20 vols. of paraffinic desorbent per volume of naphthene and paraffin, 10 to 50 vols. of olefin or aromatic-paraffin solvent per volume of single ring aromatic, 10 to 50 vols. of aromatic solvent per volume of condensed ring aromatics and 50 to 300 vols. of polar solvent per volume of non-hydrocarbons will effect complete desorption.

In general, the smaller the mesh of the silica gel, the more effective the separations will be. Silica gel with a mesh size of from 28–200 is preferred. The amount of silica gel to be used is determined by the amount of aromatics in the hydrocarbon mixture. In general, from 25 to 35 lbs. of silica gel, e.g. 30 lbs., per pound of aromatics in the hydrocarbon mixture should be used.

In some instances the mixture to be separated will have viscosities too high to be easily adsorbed by the silica gel. In such event the mixture must be diluted with a quantity of the selective paraffinic desorbent sufficient to allow the entire mixture to be absorbed on the silica gel. In general, the mixture to be separated by selective desorption should have a viscosity of from 33 SSU's at 100° F. to 200 SSU's at 100° F. in order to be most effectively adsorbed. In those instances where the mixtures to be adsorbed fit within this viscosity range, then it need not be diluted with the paraffinic desorbent. Otherwise, sufficient paraffinic desorbent is admixed with the material to bring the entire mixture within these viscosity ranges.

It was also discovered that improved results could be obtained if the silica gel is initially contacted with the first desorbing solvent, i.e., the paraffin before the introduction of the feed material, i.e., a pre-wetting. If this pre-wetting is omitted then the actual separation obtained will fall considerably short of the theoretically obtainable separation.

This is because the pre-wetting removes the heat of adsorption generated by contacting the dry adsorbent with solvent or feed. About 1 gallon of solvent for every 6–10, e.g. 7–9 lbs. of silica gel is an effective pre-wet. Elimination of this step will cause the adsorbent temperature to rise during the critical period of feed adsorption and subsequent desorption. In general, higher temperature operation substantially reduces adsorbent selectivity and consequently separation efficiency. Separations are best carried out at a temperature wherein wax crystallization and high viscosities are not encountered. For lube oil or gas oil separation, 100° to 150° F. is recommended.

The discovery that 5–15 vol. percent aromatic in paraffin was equivalent as a selective desorbing solvent to the $C_5$ to $C_{10}$ olefin was accompanied by an additional benefit. When the aromatic-paraffin selective desorbing solvent is run through the silica, the aromatic portion is at first preferentially adsorbed and initially pure paraffin comes through prior to the 5–15% aromatic-paraffin desorbing solvent. This property of silica gel can be taken advantage of by eliminating the paraffin, e.g., n-heptane, desorption solvent and in its place, use an amount of 5–15% benzene in heptane such that enough pure heptane is generated by the adsorbent so as to desorb the saturate fraction of the feed. This procedure permits the use of only 3 discrete charges (5–15% aromatic in paraffin, 100% aromatic, and polar solvent) of desorbing solvents instead of 4 (paraffin, olefin or 5–15% aromatic in paraffin, 100% aromatic and polar solvent).

The following examples illustrate the preferred method of carrying out the present invention, but they are by no means intended to be a limitation upon the technique of the invention.

EXAMPLE I

The lube stock separated by the method of this invention was 10 gallons of a paraffinic type lube distillate, namely, 250 Neutral distillate from North Louisiana crude. Separations were carried out in two 12-inch diameter by 20 ft. high columns. The capacity of each column for adsorbent was 15 cu. ft. The adsorbent in each column was 600 pounds of Davison silica gel Grade 12 (28–200 mesh). The separation scheme involved alternate operation of each column. While one column was separating the oil at 10 to 25 p.s.i.g. pressure by adsorbing it and then preferentially desorbing the components, the other column was being regenerated by hot nitrogen purging at 600° F. After regeneration, the column is completely prewet with 70 gallons of n-heptane at 15 gallons/hr. upflow. Then 10 gallons of 250 neutral distillate feed oil are diluted with 30 gallons of n-heptane and are pumped into the prewet filled tower at 10 gals./hr. upflow over the silica gel. Then 90 gallons of a solution of 10 vol. percent benzene in n-heptane are passed upflow over the silica gel. Benzene is selectively adsorbed from the mixed solvent resulting in 50 gallons of pure n-heptane which preferably desorbs the paraffins and the naphthenes from the feed. The remaining 40 gallons of mixed solvent (10% benzene in heptane) then preferentially desorbs the one-ring aromatics. 50 gallons of pure benzene are then added upflow to displace the condensed ring aromatics. The two and three ring aromatics tend to concentrate in the pure benzene that first leaves the column while the four or more ring aromatics concentrate in the benzene last to leave the column. Finally, the non-hydrocarbons are washed off the silica gel by 150 gallons of acetone. All flow rates during the separation were 10 gallons per hour. Higher flow rates reduce separation efficiency. The column was regenerated by draining the column of acetone for at least two hours downflow. This was followed by a hot nitrogen purge at 600° F. at 30 standard cu. ft. (s.c.f.) per minute downflow. At the same time the tower walls of the column were heated by superheated steam flowing through a surrounding steam jacket at 100 p.s.i.g. at 600° F. The heating cycle took about 17 hours or until the minimum bed temperature was 500° F. The tower was then cooled with a nitrogen purge at 70° F. and at 30 standard cu. ft. per minute downflow. At the same time the column walls were cooled by cold water at 10 gals. per minute at cold flow. The cooling process ran for approximately 10 hours. The toltal regeneration time utilizing this technique was approximately 27 hours.

The various fractions separated by this process are shown below.

| Cut point, wt. percent | Elution solvent | Oil fraction | Vis. Index | Oxidation stability |
|---|---|---|---|---|
| 0–65 | n-heptane | Paraffins and naphthenes.[1] | 135 | Poor but can be improved with oxidation inhibitors. |
| 70–75 | 10% Benzene in n-heptane | Arom.[2] | 94 | Poor and do not respond well to inhibitors. |
| 75–88 | In n-heptane | Arom.[3] | 25 | |
| 90–93 | Benzene | Cond. ring Arom.[4] | −48 | |
| 93–96 | do | Cond. ring Arom.[5] | −364 | Poor oxidation stability but are good oxidation inhibitors. |
| 96–98 | do | Cond. ring Arom.[6] | −856 | |
| 98–100 | Acetone | Non-hydrocarbons. | −209 | |

[1] Saturate fraction, aromatic content less than 0.5%.
[2] Single ring arom. fract. (94% IR, 6% 2R).
[3] Single ring arom. fract. (70% IR, 20% 2 and 3 R).
[4] Cond. ring arom. fract. (25% IR, 60% 2 and 3 R, 15% 4 and 5 R).
[5] Cond. ring arom. fract. (19% IR, 48% 2 and 3 R, 33% 4 and 5 R).
[6] Cond. ring arom. fract. (18% IR, 42% 2 and 3 R, 40% 4 and 5 R).

EXAMPLE II

To further illustrate the invention Example I was repeated exactly except that after the n-heptane, diluted distillate feed oil was pumped into the prewet tower, 50 gallons of n-heptane were passed upflow over the silica gel. The heptane contacting was followed by 40 gallons of diisobutylene. The 50 gallons of n-heptane and the 40 gallons of diisobutylene were in lieu of the 90 gallons of 10% benzene in n-heptane.

EXAMPLE III

To illustrate the utility of the various cutpoint wt. percent of fractions eluted from the feed stock when placed in the 0–65 cut point wt. percent saturates, that is, paraffins and naphthenes, several lubricating compositions were prepared. These compositions consisted of 85 wt. percent of the 0–65 cut point wt. percent of the paraffins plus naphthenes and 15 wt. percent of the aromatics obtained in the various cut point areas; that is, the first one was prepared with 85% paraffins plus naphthenes and 15% of the one-ring aromatics obtained from a 70–75 cut point wt. percent. The second lubricating composition was made up of 85% of the paraffins plus 15% of the one-ring aromatics of 70% purity obtained in the 75–88% cut point wt. percent. The third was prepared from 85% paraffins plus naphthenes and 15% of the two and three-ring aromatic cut obtained in the 90–93 cut point wt. percent range. The fourth sample was prepared with 85% paraffins plus naphthenes and 15% of the 4-ring aromatics obtained from all 96–98 cut point wt. percent range and the last sample was prepared with 85% paraffins and naphthenes plus 15% of the non-hydrocarbons obtained from the 98–100 cut point wt. percent. A commercial motor oil was used as a control. The six lubricating compositions including the commercial oil were then tested in the S.O.D. Bearing and Corrosion Test. This test consisted of submitting the six lubricants to a lead corrosion test in which a weighed lead strip of about 2½″ by ½″ is twirled in a 500 cc. sample of each lubricant for 16 hours at 325° F. The lead strip is then washed, reweighed and the loss in weight calculated. The viscosity at 210° F. before and after the oil's exposure to the lead strip is also measured. The results are summarized in the following table.

Table
RESULTS FROM S.O.D. BEARING AND CORROSION TEST

| Oil tested | Cut point, wt. percent | Percent vis. increase at 210° F. | Bearing wt. loss, mg. | Viscosity at 210° F., SSU | V.I. |
|---|---|---|---|---|---|
| 250 N. Dist. | 0–100 | 15 | 109 | 52.1 | 95.0 |
| Saturates (P+N) | 0–65 | 57 | 984 | 45.5 | 135 |
| 1 R Arom. (94%) | 70–75 | 45 | 515 | 60.0 | 90 |
| 1 R Arom. (70%) | 75–88 | 124 | 673 | 70.0 | 25.4 |
| 2+3 R Arom. (60%) | 90–93 | 317 | 295 | 79.0 | −48.0 |
| 4+R Arom. (40%) | 96–98 | 1,250 | 50 | 153.0 | −856.0 |
| Non-hydrocarbons | 98–100 | 1,810 | 578 | 335.0 | −290 |
| P+N+15% 1 R (94%) | | 60 | 910 | 46.8 | 127 |
| P+N+15% 1 R (70%) | | 20 | 469 | 47.2 | 123 |
| P+N+15% 2+3 R's | | 8 | 3 | 47.5 | 122 |
| P+N+15% 4+R's | | 6 | 61 | 47.5 | 122 |
| P+N+15% Non-hydrocarbons | | 7 | 646 | 49.0 | 120 |
| Premium commercial motor oil with synthetic additives | | 2 | 12 | 65.0 | 140 |

As can be seen from the preceding tables a sharp separation between paraffins and naphthenes, one-ring aromatics, and two or more ring aromatics (condensed ring aromatics) can be effected through the use of the selective desorption technique of the invention. The 250 neutral distillate by itself has a relatively low viscosity index of 95, causes a bearing weight loss of 109 milligrams and suffers a viscosity increase of 15%. The paraffinic and naphthenic components cause a bearing weight loss of 984 milligrams and experience a viscosity increase of 57%. It is seen that when the paraffinic and naphthenic components of the 250 neutral distillate are combined with a selected aromatic component of the 250 neutral distillate then a lubricating composition can be made up which has very desirable properties. Not only does it have a high viscosity index range of from 120 to 127, but causes a bearing weight loss as low as 3 and suffers a viscosity increase as low as 8% when the cut having predominantly two or three-ring aromatics is used, as shown in the S.O.D. test. Thus, from a relatively undistinguished distillate feed stock, a lubricating composition may be obtained having an excellent viscosity index coupled with a very high stability.

What is claimed is:

1. A process for separating one-ring aromatics from a substantially hydrocarbon composition containing paraffins, naphthenes, single ring aromatics and condensed ring aromatics, said process comprising adsorbing said hydrocarbon composition on silica gel; desorbing said silica gel with a paraffin capable of selectively desorbing said paraffins and naphthenes; and further desorbing said gel with an aliphatic monoolefin having a total carbon atom content within the range of 5 to 10 carbon atoms and capable of selectively desorbing said single ring aromatics.

2. A process according to claim 1, wherein said monoolefin is a branched chain hydrocarbon of 8 carbon atoms.

3. A process for separating one-ring aromatics from a substantially hydrocarbon composition containing paraffins, naphthenes, single ring aromatics and condensed ring aromatics, said process comprising adsorbing said hydrocarbon composition on silica gel; desorbing said silica gel with a paraffin capable of selectively desorbing said paraffins and naphthenes; and further desorbing said gel with diisobutylene to thereby desorb said single ring aromatics.

References Cited in the file of this patent
UNITED STATES PATENTS

| | | |
|---|---|---|
| 2,716,144 | Olson | Aug. 23, 1955 |
| 2,767,131 | Jezl et al. | Oct. 16, 1956 |
| 2,768,129 | Knox | Oct. 23, 1956 |
| 2,963,520 | Neal | Dec. 6, 1960 |
| 2,981,679 | Herrmann | Apr. 25, 1961 |

OTHER REFERENCES

Hirschler et al.: Ind. and Eng. Chem., vol. 47, No. 2, February 1955, pp. 193 to 202, copy in Sci. Lib.